US009962922B2

(12) United States Patent
Sacripante et al.

(10) Patent No.: US 9,962,922 B2
(45) Date of Patent: May 8, 2018

(54) POLYESTERAMIDE FOR 3D PRINTING

(71) Applicant: XEROX CORPORATION, Norwalk, CT (US)

(72) Inventors: Guerino G. Sacripante, Oakville (CA); Ke Zhou, Oakville (CA); Tasnim Abukar, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 336 days.

(21) Appl. No.: 14/695,480

(22) Filed: Apr. 24, 2015

(65) Prior Publication Data

US 2016/0311977 A1 Oct. 27, 2016

(51) Int. Cl.

| | |
|---|---|
| ***C08G 69/44*** | (2006.01) |
| ***B33Y 70/00*** | (2015.01) |
| ***B29C 64/106*** | (2017.01) |
| *C08G 69/48* | (2006.01) |
| *B33Y 10/00* | (2015.01) |

(52) U.S. Cl.

CPC ............ *B33Y 70/00* (2014.12); *B29C 64/106* (2017.08); *C08G 69/44* (2013.01); *B33Y 10/00* (2014.12)

(58) Field of Classification Search

CPC ........................................................ C08G 69/44

USPC ........................................................ 528/288

See application file for complete search history.

(56) References Cited

U.S. PATENT DOCUMENTS 8,460,451 B2 6/2013 Xu et al.

OTHER PUBLICATIONS

Hu et al; Method for produicng moderately crosslinked biodegradable copolymer of polyesteramide; 2008; Hubei Huali Biological Industry Co., Ltd., Peop. Pep. China; Chem Abstract 149: 557411. See 1 od 4 CAPLUS in 14695480 STN-CPC pdf.*

* cited by examiner

*Primary Examiner* — Duc Truong

(74) *Attorney, Agent, or Firm* — Pillsbury Winthrop Shaw Pittman LLP

(57) ABSTRACT

A polyesteramide for use in 3D printing includes about 1 to about 30 mole percent of a diamine monomer unit, a diol monomer unit, and a terephthalate monomer unit, the polyesteramide having a glass transition temperature ($T_g$) in a range from about 50° C. to about 95° C.

19 Claims, No Drawings

POLYESTERAMIDE FOR 3D PRINTING

BACKGROUND

The present disclosure relates to 3D printing. In particular, the present disclosure relates to new materials for 3D printing based on polyesteramide compounds.

Fused Deposition Modelling (FDM) is one of the more common modes employed in 3D printing. It has the benefit of being one of the least expensive and most accessible for 3D printers, especially for industrial prototypes and for the home hobbyist. In the FDM process, a thermoplastic material is first extruded into filament, then the filament wire supplies material into a heated nozzle. Molten thermoplastic filament is then extruded from the nozzle and material is disposed in layers.

Although several materials with unique specifications are available, such as polylactic acid (PLA) and poly-acrylonitrile-butadiene-styrene (ABS), there is a continuing need for new polymers and polymer combinations to provide a wider selection of specifications and capabilities to address various downstream applications of the resultant printed object. In addition to seeking new materials with desirable physical property characteristics, there is also a need for the development of environmentally friendly and benign materials. For example, ABS under the nozzle printing temperatures of greater 200° C., liberates toxic residual monomers such as styrene and acrylonitrile. For some FDM 3D printing applications, Nylon-6 and 12 polyamide resins have been employed, but these polyamides are not sustainable.

SUMMARY

In some aspects, embodiments herein relate to polyesteramides for use in 3D printing comprising about 1 to about 30 mole percent of a diamine monomer unit, a diol monomer unit, and a terephthalate monomer unit, wherein the polyesteramide has a glass transition temperature ($T_g$) in a range from about 50° C. to about 95° C.

In some aspects, embodiments herein relate to methods of making a polyesteramide comprising copolymerizing in the presence of a catalyst a mixture comprising a diamine monomer unit, a diol monomer unit, and a depolymerized polyethylene terephthalate, wherein copolymerizing is conducted at a temperature in a range from about 150° C. to about 220° C., and removing any excess diol monomer unit under reduced pressure.

In some aspects, embodiments herein relate to methods of 3D printing comprising providing a polyesteramide for use in 3D printing comprising about 10 mole percent to about 30 mole percent of a diamine monomer unit, about 10 mole percent to about 40 mole percent a diol monomer unit, and about 45 mole percent to about 55 mole percent a terephthalate monomer unit, the method further comprising extruding the polyesteramide to provide a filament, and supplying the filament to a heated nozzle to apply the polyesteramide to a substrate to form 3D object on the substrate.

DETAILED DESCRIPTION

Embodiments herein provide sustainable polyesteramide resins for use in 3D printing technology. The polyesteramides are low cost, and can be primarily synthesized from oligomers obtained from recycled plastics and bio-based monomers including diols, such as 1,4-butanediol and small amounts diamines, such as 1,6-heaxanediamine. The resultant polyesteramides may be over 80% derived from sustainable monomers and provide better elongation at break and superior fatigue resistance.

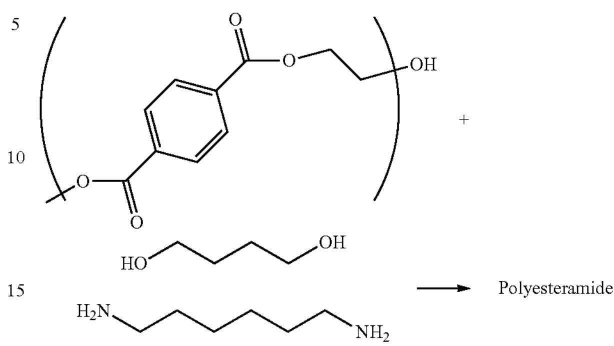

In embodiments, the polyesteramides are accessible via depolymerizing polyethylene terephthalate plastic bottles, and varying amounts of diol and diamine. A particularly suitable starting material for the polyesteramides disclosed herein is a commercially available depolymerized product of recycled polyethylene terephthalate (PET) plastic bottles (Polylite, Reichhold Corporation), which is an oligomer with Mw of about 800. By way of example, varying the ratio of PET with a series monomers such as 1,4-butane-diol and 1,6-hexanediamine, numerous polyesteramides can be obtained. These materials each exhibit a wide array of physical characteristic features, while providing environmentally friendly products. These and other advantages will be apparent to those skilled in the art.

In embodiments, there are provided polyesteramide for use in 3D printing comprising about 1 mole percent to about 30 mole percent of a diamine monomer unit, a diol monomer unit, and a terephthalate monomer unit. The polyesteramide displays a glass transition temperature ($T_g$) of from about 45° C. to about 100° C. In embodiments, the polyesteramide comprises from about 10 to about 25 mole percent of diamine monomer unit.

In particular, the polyesteramides disclosed herein are particularly suitable for 3D printing via fused deposition modeling processes. In embodiments, the number average molecular weight of the polyesteramides may be in a range from about 5,000 to about 100,000 grams per mole, or from about 10,000 to about 200,000 grams per mole. In embodiments, the weight average molecular weight of the polyester amides may be in a range from about from about 10,000 to about 500,000 grams per mole, or from about 20,000 to about 200,000 grams per. Certain physical properties render the polyester amides suitable for use in 3D printing, these include a softening point ranging from about 150° C. to about 250° C., or from about 150° C. to about 230° C.; a freezing point ranging from about 10° C. to about 100° C., from about 20° C. to about 75° C., or from about 25° C. to about 60° C.; a viscosity of from about 200 centipoise to about 10,000 centipoise at 100° C. to about 200° C.; a Young's Modulus of from about 0.5 to about 5 gigapascals or from about 0.5 to about 2 gigapascals; a Yield Stress of from about 10 to about 100 megapascals or from about 10 to about 60 megapascals; a $T_g$ of from about 50° C. to about 100° C. or from about 60° C. to about 90° C.

The softening point ($T_s$) of the polyesteramide, can be measured by using the cup and ball apparatus available from Mettler-Toledo as the FP90 softening point apparatus and using the Standard Test Method (ASTM) D-6090. The measurement can be conducted using a 0.50 gram sample and heated from 100° C. at a rate of 1° C./min.

The glass transition Temperature ($T_g$) and melting point ($T_m$) of the sustainable resin, can be recorded using the TA Instruments Q1000 Differential Scanning calorimeter in a temperature range from 0 to 150° C. at a heating rate of 10° C. per minute under nitrogen flow. The melting and glass transition temperatures can be collected during the second heating scan and reported as the onset.

Young's modulus and Yield Stress can be measured using the 3300 Mechanical Testing Systems available from Instron, by the ASTM 638D method and using the sustainable resin filament of about 2 mm in diameter.

In embodiments, the diamine monomer unit is a $C_2$ to $C_{12}$ diamine, such as a $C_6$ diamine, for example, 1,6-hexanediamine. In embodiments, the diamine is aliphatic diamine having 2 to 12 carbon atoms. In embodiments, the diamine is 1,3-propanediamine, or 1,4-butanediamine, or 1,5-pentanediamine, or 1,6-hexanediamine or 1,7-heptanediamine or 1,8-octanediamine, or 1,9-nonanediamine or 1,10-decanediamine or 1,11-undecanediamine or 1,12-dodecanediamine.

In embodiments, the two amines of the diamine are unsubstituted at nitrogen, i.e., the two amines are —$NH_2$ groups. In embodiments, the two amines of the diamine are independently unsubstituted (—$NH_2$) or monosubstituted (—NHR). When monosubstituted, R may comprise a $C_1$-$C_4$ lower alkyl group. In embodiments, the carbon chain of the diamine may be optionally substituted at any carbon atom. Such optional substitution may include halogen, $C_1$-$C_4$ alkyl, $C_1$-$C_4$ alkoxy, and combinations thereof.

In embodiments, the diol monomer unit is a $C_2$ to $C_6$ diol, such as a $C_4$ diol, for example as 1,4-butanediol. In embodiments, the diol monomer unit is an aliphatic diol having 2 to 6 carbon atoms. In embodiments, the diol monomer unit is 1,2-ethandiol (ethylene glycol), or 1,3-propanediol, or 1,4-butanediol or 1,5-pentanediol or 1,6-hexanediol. In embodiments, the diol monomer unit may be selected to be bio-derived, such as 1,4-butanediol (BDO). In embodiments, the carbon chain of the diol may be optionally substituted at any carbon atom. Such optional substitution may include halogen, $C_1$-$C_4$ alkyl, $C_1$-$C_4$ alkoxy, and combinations thereof.

In embodiments, the diol monomer unit is present in an amount in a range from about 5 mole percent to about 45 mole percent, or from about 10 mole percent to about 40 mole percent of the polymer.

In embodiments, the terephthalate group is provided as bis-ester for polyesteramide preparation. For example, the terephthalate group may be the bis-methyl ester, i.e., dimethyl terephthalate. Other bis-esters may include diethyl terephthalate, dioctyl terephthalate, and the like. That is, any $C_1$-$C_8$ alkyl diester of terephthalic acid may be employed as a starting material to access the polyesteramides disclosed herein. In embodiments, the terephthalate group is sourced from recycled plastics, such as polyethylene terephthalate (PET). When employing recycled PET, the plastic may be partially or fully depolymerized. In particular embodiments, PET may be depolymerized to an effective average molecular weight of about 800, or in a range from about 600 to about 1,000. In embodiments, the aromatic ring of the terephthalate group may be optionally substituted at any carbon atom. Such optional substitution may include halogen, $C_1$-$C_4$ alkyl, $C_1$-$C_4$ alkoxy, and combinations thereof.

In embodiments, the polyesteramide has a Yield Stress of from about 10 to about 100 megapascals, or from about 10 to about 60 megapascals.

In embodiments, the polyesteramide has a yield strain in a range from about 1 percent to about 10 percent, or from about 5 percent to about 8 percent.

In embodiments, the polyesteramide has a Young's Modulus in a range from about 0.5 to about 5 gigapascals, or from about 0.5 to about 2 gigapascals In embodiments, the polyesteramide has a breaking strain in a range from about 10 percent to about 100 percent, or from about 10 percent to about 60 percent In embodiments, the polyesteramide has a breaking stress in a range from about 10 to about 100 megapascals, or from about 10 to about 60 megapascals.

In embodiments, the polyesteramide is provided in a form suitable for incorporation in a 3D printing apparatus. Thus, for example, the polyesteramide may be provided as a spooled filament or in granule form.

In embodiments, there are provided methods of making a polyesteramide comprising copolymerizing in the presence of a catalyst a mixture comprising a diamine monomer unit, a diol monomer unit, and a depolymerized polyethylene terephthalate, wherein copolymerizing is conducted at a temperature in a range from about 150° C. to about 220° C., and the method further comprising removing any excess diol monomer unit under reduced pressure.

In embodiments, the catalyst is tin-based. Such catalysts may be based on tin (II) or tin (IV) oxidation states. In embodiments, the tin-based catalyst are mono- or dialkyl tin-based. Monoalkyl tins may further comprise oxide and/or hydroxide groups at the tin atom. In embodiments, the tin-based catalyst comprises a mixture of monobutyltin oxide, monobutyltin hydroxide oxide, and butyl stannoic acid, commercially available as FASCAT® 4100. Other tin-based catalysts employed in transesterification chemistry are well-known in the art and can be used as well to prepare the polyesteramides herein, such as octabutyltetrathiocyanatostannoxane.

In embodiments, the diamine monomer unit is present in a range from about 5 to about 40 mole percent, or from about 10 to about 30 mole percent of the mixture.

In embodiments, the diol monomer unit is present in a range from about 5 to about 40 mole percent, or from about 10 to about 40 mole percent of the mixture.

In embodiments, the exact amounts of diol monomer unit and diamine monomer unit can be varied to achieve a target $T_g$. For use in conventional FDM modeling with 3D printers, the target $T_g$ can be in a range from about 50° C. to about 100° C., or from about 60° C. to about 90° C. Selection of a particular $T_g$ may be guided by a particular instrument, downstream application, compatibility with other materials used in mixed 3D print materials, such as mixed organic materials, mixed organic-inorganic materials, and the like. Other considerations for selection of a target $T_g$ will be appreciated by those skilled in the art.

In embodiments, the depolymerized polyethylene terephthalate is present in a range from about 45 to about 55 mole percent, or from about 48 to about 52 mole percent of the mixture.

In embodiments, the depolymerized polyethylene terephthalate is derived from a recycled material.

In embodiments, the polyesteramide is formed into a spool or granules for use in 3D printing.

In embodiments, there are provided methods of 3D printing comprising providing a polyesteramide for use in 3D printing comprising about 1 to about 30 mole percent or from about 10 to about 30 mole percent of a diamine monomer unit; a diol monomer unit, and a terephthalate monomer unit, the method further comprising extruding the polyesteramide to provide a filament, and supplying the filament to a heated nozzle to apply the polyesteramide to a substrate to form an object on the substrate.

In embodiments, the diol unit is present in a range from about 5 to about 45 mole percent, or from about 10 mole percent to about 40 mole percent of the polymer.

In embodiments, the terephthalate is present in a range from about 45 mole percent to about 55 mole percent, or from about 48 mole percent to about 52 mole percent.

When 3D printing with the polyesteramides disclosed herein there may be provided a support material. This material is generally removable and serves as a temporary support when making complex three-dimensional objects. Suitable support materials are well known in the art. See for example, U.S. Pat. No. 8,460,451 which is incorporated herein by reference in its entirety.

The support material may be delivered through the same or different print head as the polyesteramide material. The support material is often delivered as a liquid and typically comprises a hydrophobic chemical material that is solid at ambient temperature and liquid at elevated application temperatures. However, unlike the polyesteramide material, the support material is subsequently removed to provide the finished three-dimensional part.

Removal of the support material can be accomplished through several processes, including heating the support material to a temperature above its melting point in conjunction with the use of a suitable organic carrier to sufficiently remove the support material from the polyesteramide material.

In embodiments, a method of printing a three dimensional article comprises selectively depositing layers of a polyesteramide, as disclosed herein, as a build material to form the three dimensional article on a substrate, the build material may optionally include a diluent. In embodiments, a method of printing a three dimensional article further comprises supporting at least one layer of the build material with a support material. Additionally, the build material and/or support material, in embodiments of methods described herein, is selectively deposited according to an image of the three dimensional article, the image being in a computer readable format.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This example describes the preparation and characterization of exemplary polysesteramides in accordance with embodiments herein.

Sample 1, 10% Hexanediamine:

To a 1-L Parr reactor equipped with a mechanical stirrer, and a distillation apparatus was added 517.94 g of depolymerized recycled PET (Polylite, Reichhold Corporation), 73.05 g of 1,4 butanediol, 30.60 g of 1,6 hexanediamine and 2.03 g of tin (Sn) catalyst FASCAT® 4100 (Arkema Chemicals). The mixture was heated to 160° C. under a nitrogen purge (1 scfh), and then slowly increased to 190° C. over a three hour period and maintained for an additional 18 hours, to allow trans-esterification between 1,4 butanediol and depolymerized PET. The mixture was then heated from 190° C. to 210° C. over a 1.5 hour period and then vacuum was applied to remove the excess butanediol to allow further polycondensation. The mixture was then slowly heated to a final temperature of 235° C., while under vacuum, until a softening point of 197.4° C. was reached. The resin displayed a glass transition temperature of 74.5° C.

Sample 2, 20% Hexanediamine:

To a 1-L Parr reactor equipped with a mechanical stirrer, and a distillation apparatus was added 518.02 g of depolymerized recycled PET, 49.05 g of 1,4 butanediol, 61.38 g of 1,6 hexanediamine and 2.01 g of Sn catalyst FASCAT® 4100. The mixture was heated to 160° C. under a nitrogen purge (1 scfh), and then slowly increased to 190° C. over a three hour period and maintained for an additional 18 hours, to allow trans-esterification between 1,4 butanediol and depolymerized PET. The mixture was then heated from 190° C. to 210° C. over a 1.5 hour period and then vacuum was applied to remove the excess butanediol to allow further polycondensation. The mixture was then slowly heated to a final temperature of 240° C., while under vacuum, until a softening point of 230.8° C. was reached. The resin displayed a glass transition temperature of 83.8° C.

Characterization:

Resin filaments were made using the Melt Flow Index (MFI) instrument, by melting the sample of resin in the heated barrel and extruding it through an orifice of a specific diameter, under a certain weight. Then the mechanical properties of the resin filaments made were measured using the Instron Tensile Testing System and compared with the commercial ABS and PLA 3D materials. The results, summarized in Table 1 and Figure 1 show that the Sample 1 with 10% 1,6-hexanediamine has similar characteristics as commercial PLA 3D material. Table 1 below shows the comparison of Sample 1 with commercial 3D materials.

| Resin Filaments | Molar Ratio PET/BDO/Hexanediamine | Yield stress (MPa) | Yield strain (%) | Modulus | Breaking strain (%) | Breaking stress (MPa) |
|---|---|---|---|---|---|---|
| ABS Natural | — | 41.62 | 4.85 | 1.307 | 65 | 20.16 |
| PLA True Black | — | 67.87 | 5.31 | 1.932 | 26 | 28.82 |
| Sample 1 | 50/40/10 | 44.2 | 4.56 | 1.436 | 4.77 | 24.32 |
| Sample 2 | 50/30/20 | 17.8 | 1.73 | 1.30 | 2.01 | 9.47 |

What is claimed is:

1. A melamine-free polyesteramide for use in 3D printing comprising:

about 1 to about 30 mole percent of a diamine monomer unit;

a diol monomer unit; and a recycled terephthalate monomer unit;

wherein the polyesteramide has a glass transition temperature ($T_g$) in a range from about 50° C. to about 95° C.

2. The polyesteramide of claim 1, wherein the diamine monomer unit is an aliphatic diamine having 2 to 12 carbon atoms.

3. The polyesteramide of claim 1, wherein the diamine monomer unit is 1,6-hexanediamine.

4. The polyesteramide of claim 1, wherein the diol monomer unit an aliphatic diol having 2 to 6 carbon atoms.

5. The polyesteramide of claim 1, wherein the diol monomer unit is 1,4 butanediol.

6. The polyesteramide of claim 1, wherein the diol monomer unit is present in an amount in a range from about 5 to about 45 mole percent of the polymer.

7. The polyesteramide of claim 1, wherein the polyesteramide has a yield stress in a range from about 10 megapascals to about 100 megapascals.

8. The polyesteramide of claim 1, wherein the polyesteramide has a yield strain in a range from about 1% to about 10%.

9. The polyesteramide of claim 1, wherein the polyesteramide has a Young's Modulus in a range from about 0.5 to about 5 gigapascals.

10. The polyesteramide of claim 1, wherein the polyesteramide has a breaking strain in a range from about 10% to about 100%.

11. The polyesteramide of claim 1, wherein the polyesteramide has a breaking stress in a range from about 10 megapascals to about 100 megapascals.

12. The polyesteramide of claim 1, wherein the polyesteramide is provided in a form suitable for incorporation in a 3D printing apparatus as a spooled filament or granules.

13. A method of making a melamine-free polyesteramide comprising:

copolymerizing in the presence of a catalyst a mixture comprising:

a diamine monomer unit;

a diol monomer unit; and a depolymerized polyethylene terephthalate, wherein the depolymerized polyethylene terephthalate is derived from a recycled polyethylene terephthalate;

wherein copolymerizing is conducted at a temperature in a range from about 150° C. to about 220° C.; and removing any excess diol monomer unit under reduced pressure.

14. The method of claim 13, wherein the catalyst is tin-based.

15. The method of claim 13, wherein the diamine monomer unit is present in a range from about 10% mole percent to about 25 mole percent of the mixture.

16. The method of claim 13, wherein the diol monomer unit is present in a range from about 10 mole percent to about 40 mole percent of the mixture.

17. The method of claim 13, wherein the depolymerized polyethylene terephthalate is present in a range from about 45 mole percent to about 55 mole percent of the mixture.

18. The method of claim 13, wherein the polyesteramide is formed into a spool for use in 3D printing.

19. A method of 3D printing comprising:

providing a melamine-free polyesteramide for use in 3D printing comprising:

about 10 mole percent to about 30 mole percent of a diamine monomer unit;

about 10 mole percent to about 40 mole percent a diol monomer unit; and about 45 mole percent to about 55 mole percent a terephthalate monomer unit, wherein the terephthalate monomer unit is obtained from recycled polyethylene terephthalate;

extruding the polyesteramide to provide a filament; and supplying the filament to a heated nozzle to apply the polyesteramide to a substrate to form 3D object on the substrate.

* * * * *